Dec. 3, 1957 G. A. DICKINSON 2,815,181
REEL FOR LAWN HOSE
Filed May 3, 1955
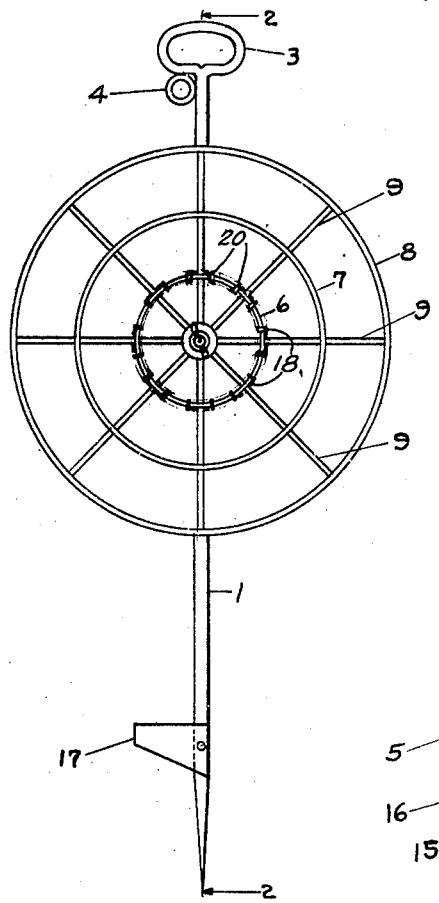
FIG. 1.
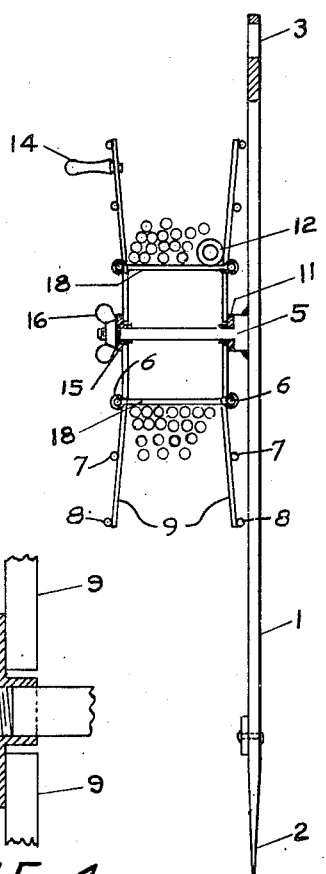
FIG. 2.
FIG. 4.
FIG. 5.
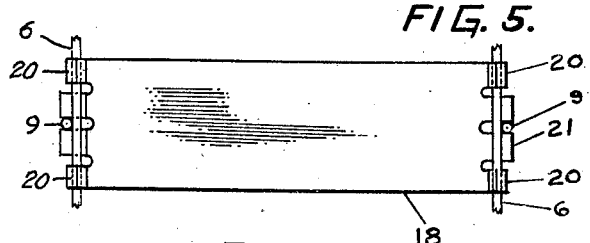
FIG. 3.
George A. Dickinson INVENTOR.
BY Bush & Bush
His Attorneys.

United States Patent Office 2,815,181
Patented Dec. 3, 1957

2,815,181

REEL FOR LAWN HOSE

George A. Dickinson, Davenport, Iowa

Application May 3, 1955, Serial No. 505,642

7 Claims. (Cl. 242—96)

My invention relates to an improvement in reels for lawn or garden hose.

The objects of my invention are to provide an improved self-supporting reel which will carry 100 feet more or less of plastic or other hose for water; to provide means for readily carrying the reel by hand with the hose wound thereon and for winding or unwinding the hose on or from the reel; to provide a vertical bar or post support for a reel, one end of which can be readily inserted in the ground and moved from place to place with a horizontal brace united thereto which can be driven into the earth by foot pressure adapted to prevent rotation of the vertical post while the reel is being wound or unwound; to provide a rod or post with a horizontal axle shaft united thereto and carrying a light wire reel revolvably mounted thereon with crossbars upon which a hose can be readily wound or removed.

Other objects will appear from the specification.

My improvement is illustrated in the attached drawings, in which—

Figure 1 is a front elevation of my reel and supporting post;

Figure 2 is an elevation partly in section on the line 2—2 of Figure 1;

Figure 3 is an enlarged detail plan view of one of the crossbars which support the hose and unite the two sides of the reel;

Figure 4 is an enlarged detail of washer, wing nut and shaft;

Figure 5 is a detail of the crossbar clamped to the inner ring of the reel.

Similar numerals refer to similar parts throughout the several views.

My reel comprises an upright rod or post 1 preferably of any suitable rustproof metal, with its lower end 2 pointed for easy insertion into the ground and with a loop 3 at the upper end thereof adapted to act as a handle integral with the post.

A ring 4 is provided adjacent the handle in which the nozzle of a hose can be inserted for convenient storage when not in use.

A horizontal brace plate 17 is united to the post below the reel at a convenient height which can readily be forced into the ground by foot pressure and will act to prevent the post being turned in the ground when the hose is being wound upon or unwound from the reel.

A horizontal axle shaft 5 has one end united to the post preferably by welding and projects horizontally at a right angle therefrom.

Upon the axle shaft, a circular reel is mounted by bearings or washers 11, 15, with central flanges formed thereon projecting inwardly and revolvable upon the axle shaft 5 as bearings.

The reel is formed with a plurality of wires or metal rings 6, 7 and 8 or more having welded thereon a plurality of spokes 9. For durability I prefer to form my reel with eight of the spokes, but the number may be varied to suit the requirements of different cases.

These spokes 9 are also united to the washers 11, 15 by welding or other suitable means.

The inner ring 6 is provided with a plurality of crossbars 18 which extend transversely of the reel and are attached to the rings 6 on opposite sides of the reel by fingers 20 or other suitable means.

A small metal ring 12 is united to the inner ring 6 adapted to receive and hold one end of a hose to be wound upon the reel.

A handle 14 may be united to the outermost ring 8 by which the reel may be manually turned if desired, or the reel can readily be turned by grasping the ring 8 and exerting traction thereon either forwardly or backwardly.

The reel will be held against lateral movement inwardly on the axle shaft by the bearing plate 11 adjacent the post and will be restrained from movement in the other direction by a wing nut 16 threaded upon the outer end of the axle 5.

In the operation of my reel, the hose can have one end inserted in the ring 12 and be wound upon the reel in the ordinary way. The reel may then be carried to the place where the hose is to be used and the lower end of the post 1 inserted in the ground far enough to cause the brace 17 to enter the ground thereby securing the post against turning.

The hose can then be unreeled, the nozzle attached to one end thereof and the other end connected to the water supply pipe. It will then be ready to sprinkle the lawn or such other surface as desired.

I prefer to form the reel with the spokes 9 sloping outwardly from the center so that the outer rings 8 will be spaced a little wider apart than the center rings 6. When storing the reel, the crossbars 18 may be removed and the opposite sides of the reel brought together.

Various modifications in the size, proportions and material of the parts may be made without departing from the spirit of my invention as expressed in the claims and I do not limit my claims to the precise forms shown in the drawings.

I claim:

1. A combined carrier and supporter for lawn and garden hose, including an upright rod to act as a post with a loop handle at the upper end thereof and its lower end adapted for ready insertion in the ground, a horizontal axle shaft with one end welded to the rod at a right angle thereto, a reel mounted upon said axle including a pair of spaced annular bearings revolvably mounted upon the axle shaft and spaced apart a plurality of radial spokes welded to the bearings, a plurality of spaced wire rings united to the spokes concentrically on each side of the reel and a plurality of parallel spaced bars mounted upon the innermost wire rings.

2. A reel as described in claim 1, and a lateral brace plate united to the rod adapted to be forced into the ground when the rod is inserted therein whereby it can prevent turning of the rod in the ground.

3. In a carrier for lawn and garden hose, the combination with a vertical rod to act as a post of small cross-section, of a loop handle at the upper end thereof and the lower end pointed and adapted for ready insertion in the ground, a horizontal axle shaft with one end welded to the post at a right angle thereto a reel mounted upon the axle shaft including, a pair of spaced annular bearing plates with projecting central flanges revolvably mounted upon the axle shaft and spaced apart, a plurality of radial spokes welded to the bearing plates and a plurality of spaced wire rings united to the spokes concentrically on each side of the reel.

4. A carrier as described in claim 3, and a plurality of crossbars mounted upon the inner wire rings.

5. A reel as described in claim 3, and a plurality of crossbars removably mounted upon a pair of opposite wire rings.

6. In a supporting appliance for garden hose, the combination with a supporting rod, of a handle at the upper end thereof and the lower end adapted for ready insertion in the ground or withdrawal therefrom, a horizontal axle with one end welded to the rod at a right angle thereto, a pair of spaced annular bearing plates with inwardly projecting central flanges revolvably mounted upon the axle and spaced apart, a plurality of radial spokes rigidly united to the bearing plates and a plurality of spaced wire rings united to the spokes concentrically on each end of the axle.

7. A supporting appliance for hose as described in claim 6, and a flat plate united to the supporting rod near the lower end thereof adapted to be forced into the ground by foot pressure and to resist or impede rotation of said supporting rod.

References Cited in the file of this patent

UNITED STATES PATENTS

| | | |
|---|---|---|
| 1,451,745 | Sommer | Apr. 17, 1923 |
| 1,871,483 | Uitendaal | Aug. 16, 1932 |
| 2,078,081 | Kramer | Apr. 20, 1937 |
| 2,236,305 | Ahlin | Mar. 25, 1941 |

FOREIGN PATENTS

| | | |
|---|---|---|
| 468,751 | Canada | Oct. 17, 1950 |